Dec. 26, 1933.  A. B. WELTY  1,941,029
HARVESTER THRESHER
Filed Oct. 19, 1932  2 Sheets-Sheet 1

Inventor
Albert B. Welty
By N. P. Davlin Atty.

Dec. 26, 1933.　　　　A. B. WELTY　　　　1,941,029
HARVESTER THRESHER
Filed Oct. 19, 1932　　　2 Sheets-Sheet 2

Inventor
Albert B. Welty
By H. P. Durie, Atty.

Patented Dec. 26, 1933

1,941,029

UNITED STATES PATENT OFFICE 1,941,029

HARVESTER THRESHER

Albert B. Welty, Kenilworth, Ill., assignor to International Harvester Company, a corporation of New Jersey Application October 19, 1932. Serial No. 638,547

11 Claims. (Cl. 56—122)

This invention relates to harvester threshers of the type employing a bagging platform. Such bag platforms also include a bag chute and the combined bagging structure is usually in the nature of an attachment carried at the stubbleward side of the machine adjacent its main carrying wheel. It is found during transport of the machine over highways and through gates that frequently this lateral projection of the bag platform and chute attachment constitutes an objectionable encumbrance, as it so increases the lateral width of the harvester thresher as to make it impossible to get through certain narrow places.

More particularly, then, this invention relates to an improved mounting for the bag platform and chute attachment, whereby the same may be compactly collapsed and folded upwardly, snugly alongside the adjacent side of the harvester thresher, so as to narrow the machine materially and permit transport clearance through narrow places.

The main object of the invention is to provide a bagging platform and chute foldingly carried by the harvester thresher.

Another object is to provide folding structure of the kind stated in such a simple manner that a single person may accomplish the result in but a few minutes with a minimum of effort and without the need of any special tools or equipment.

Further objects of the invention will become apparent to those skilled in this art as the disclosure is more fully made.

Briefly, these desirable objects are achieved by the structure shown in the accompanying sheets of drawings, said structure generally involving foldable and collapsible connections and elements quickly to enable compacting and upward swinging movement of the attachment snugly along side the stubbleward or adjacent side of the harvester thresher to narrow the overall width thereof.

Figure 1:
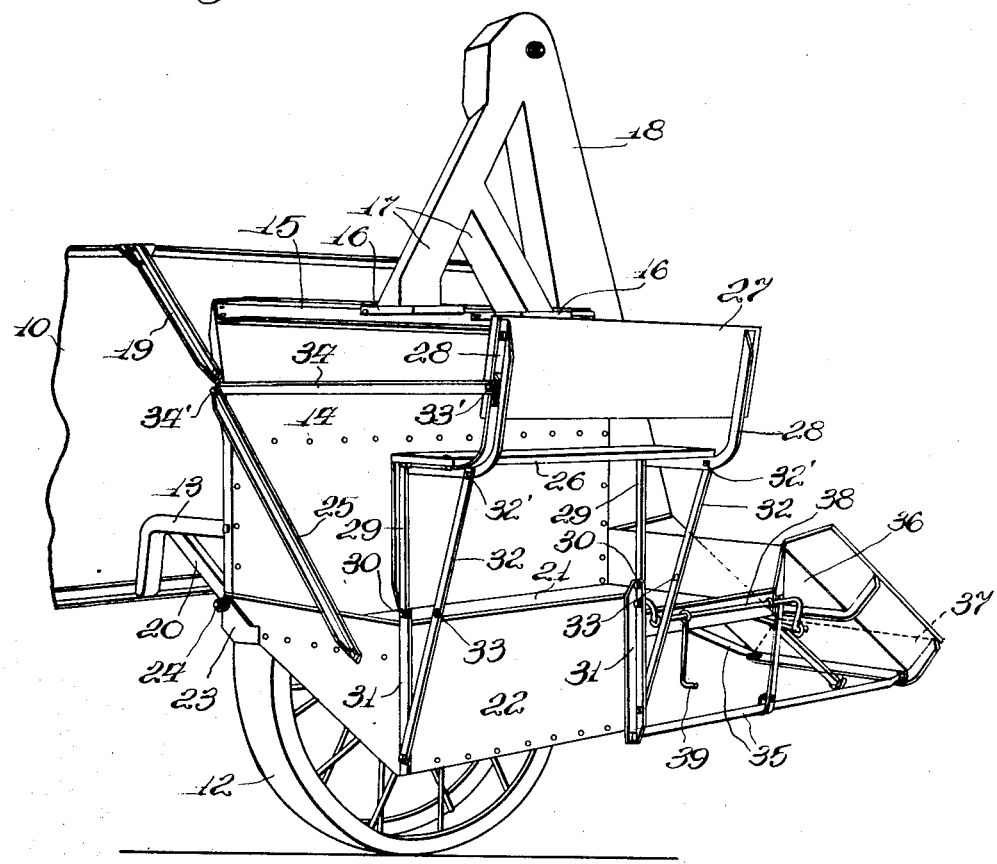
Figure 1 is a general perspective view of the rear stubbleward side of the harvester thresher carrying the bagging platform structure in operative, or unfolded position.

The harvester thresher shown in the drawings conventionally embodies the thresher or separator body 10, only the stubbleward side thereof being shown, as this is sufficient for the purpose of this disclosure. Said body is carried on the usual axle 11 mounted in wheels, only the main or stubbleward wheel 12 being herein shown.

Figure 2:
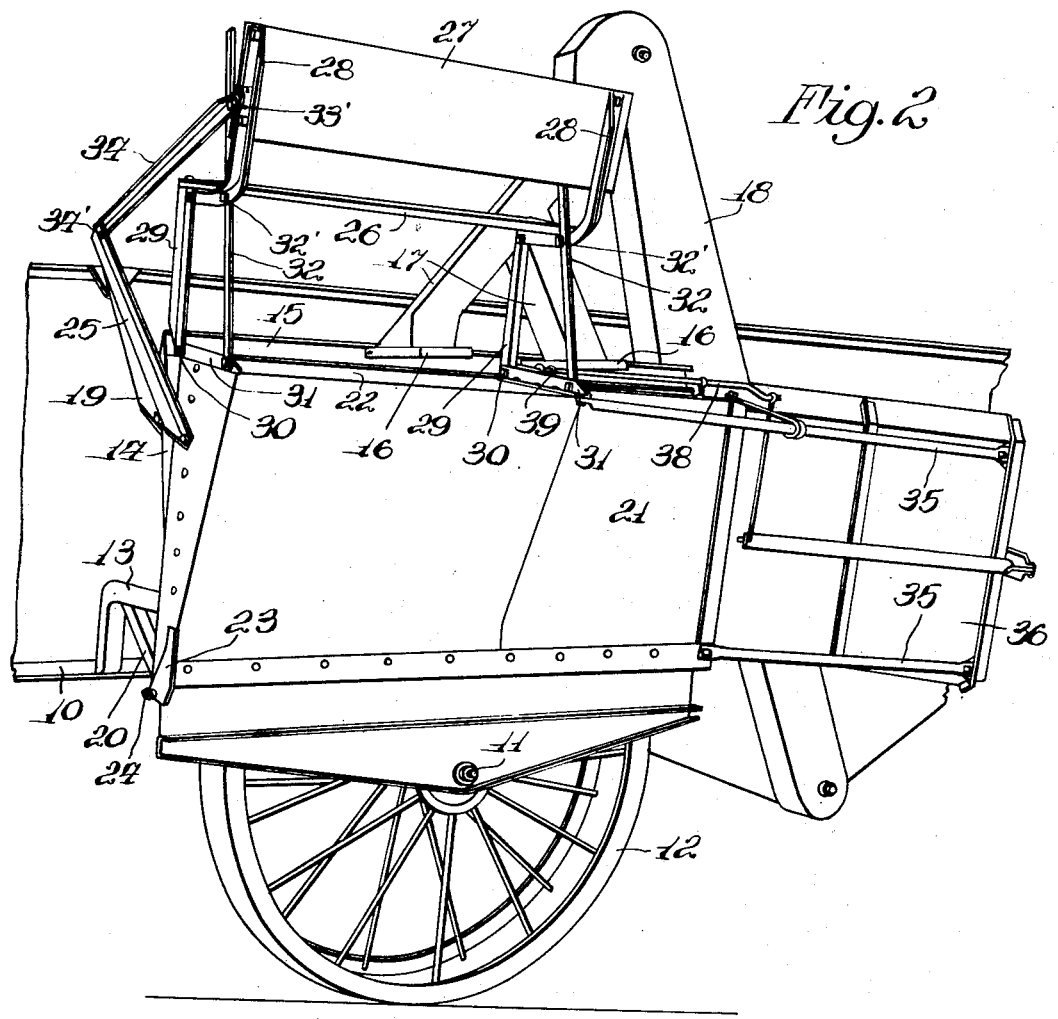
Figure 2 is a similar, perspective view, but showing the bagging attachment folded to its transport position; and, Figure 3 is a detail view, partly in section, showing a latch element to hold the attachment folded.
Figure 3:
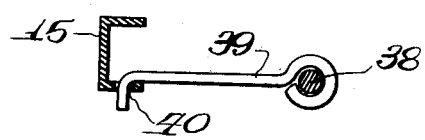

Extending laterally from the body 10 is a support bracket 13 to which is secured a longitudinally extending vertical sheet metal wall 14 carrying along its upper marginal edge a channel-shaped stiffener bar 15 (see also Figure 3). This bar 15 carries two bag holding devices 16. As is well known, these holders carry bags to receive the cleaned and threshed grain coming from a pair of bag filling spouts 17 receiving the grain from the seperator body 10 by means of the usual grain elevator 18. The vertical wall 14 is appropriately braced to the body 10 by an upper brace 19 and a lower brace 20, and its lower edge is mounted through the intermediary of a longitudinal beam 14' on the stubbleward end of the main axle 11, as shown in Figure 2.

The bagging platform is shown at 21 normally extending horizontally from the lower edge of the wall 14, the platform including a built-in hopper bottom 22 to catch and save spilled grain in a well known manner. This platform structure includes a bracket 23 at its forward end, that serves to hingedly or foldingly connect the platform by means of a hinge pin or bolt 24 to the ends of the wall 14, as shown. At its rearward end, not shown, the platform may be similarly connected to the body 10. One or more braces 25 serve to hold the platform 21 rigidly in normal bagging position, as shown in Figure 1, said brace being connected at one end to the front wall of the platform hopper 22 and at its other end to the front edge of the upright wall 14.

A bagger's seat 26 including a back rest 27 is provided at the outer longitudinal edge of the platform 21, said seat parts carried on front and rear angularly shaped brackets 28 mounted on uprights 29, which at their lower ends are connected by bolts 30 to corner frame pieces 31 forming part of the hopper 22. Upwardly and outwardly extending, front and rear braces 32 connect between the pieces 31 and brackets 28 rigidly and securely to hold the seat 26 in proper position, as appears in Figure 1. It is to be noted that intermediately of their ends these braces 32 are provided with a hole 33 for a purpose later to appear. The seat back is further braced by a front, transverse brace 34 connected to the front edge of the backboard 27 and to the front edge of the wall 14 by a bolt 34', which, by the way, is the same bolt for connecting the brace 25 to said wall 14.

The platform 21 carries at its rear portion frame supports 35, which extend longitudinally to the rear to carry a conventional, inclined bag chute portion 36 of the bagger's platform, said chute serving to store an accumulation of filled bags by means of a tail-board 37. When the desired number of bags has accumulated, the operator can actuate a crank rod 38 to release the tail-board 37 in a well known manner to cause the bags to discharge onto the field by gravity as the harvester thresher travels along. It is to be noted that (see Figure 3) the rod turnably carries a hook 39, and that the channel bar 15 heretofore described is provided with a hole 40 adapted to receive the hook. The operation and use of the structure now completely described will next be set forth.

When the harvester thresher is moving through a field harvesting grain, the bagging platform and chute are in their normal position, as appears in Figure 1, in which position the operator or bagger, as he may be called, stands on the platform 21 or occupies the seat 26. The bags on the holders 16 are filled, sewed up, and laid by the bagger on the chute 36, and, when a predetermined number of filled bags accumulates, the bagger from his station on the platform releases the tail-board 37 by the shaft 38 to allow the bags to be discharged onto the ground by gravity, all in a manner well known and established in this art.

Let us assume that a particular field has been completely harvested, and that it is now desired to transport the machine through gateways and over narrow roads or bridges to the next field to be cut and threshed. It now becomes desirable to narrow the overall width of the machine by folding the bag platform and chute structure compactly alongside of the machine, as shown in Figure 2. This is simply accomplished by the bagger, who gets down off his platform and, by means of an ordinary wrench, loosens a bolt 33' which fastens the brace 34 to the seat bracket 28, but does not remove the brace from the seat bracket; he then removes bolt 34' to disconnect braces 25 and 34 from the wall 14 and then uses the same bolt to loosely connect braces 25, 34 together again, where they meet at an angle, as shown. Similarly then, bolts 32' are removed from the seat brackets 28 to free the upper ends of the two braces 32, whereupon, due to the hinge pins 30, the seat supports 29 may be swung outwardly and downwardly, causing the stay braces 32 to pass inside the brackets 28 and in the space between the seat 26 and seat back 27, until the holes 33 in said stay braces 32 are in a position to be secured to the bend in the seat brackets 28 by the bolts 32'. The seat structure has now been collapsed and the entire bag platform and chute structure is ready for folding movement. This is accomplished by the attendant who manually lifts and pushes the entire attachment upwardly about the hinge 24 to the position shown in Figure 2, and, when the entire bagging platform has been moved up as a unit to this position, the hook 39 is made to engage the hole 40 in the bar 15 to retain the folded unit in folded position. As a result, the bagging unit has been completely folded, thereby narrowing the machine materially to make for easier transport through narrow places. Collapsing the seat as described assures that in its folded position said seat will not cause interference with the spout structure 17.

From this disclosure it will now be apparent that an improved mounting for a bagging attachment on a harvester thresher has been provided, which achieves all of the desirable objects heretofore recited.

It is the intention to cover all such changes and modifications of the illustrative example herein chosen for purposes of this disclosure which do not depart from the spirit and scope of the invention as indicated by the following claims.

What is claimed is:

1. The combination with a harvester thresher having a separator body carried on a main wheel, support means on the body extending stubblewardly of said wheel, said means pivotally carrying a bagging platform normally disposed at the stubbleward side of said wheel, means for securing the platform in such position, said securing means being detachable whereupon the platform may be folded upwardly to narrow the width of the machine.

2. The combination with a harvester thresher having a separator body carried on an axle and main wheel, a vertical longitudinally disposed wall supported from the body and on said axle closely adjacent said separator body and stubblewardly of said wheel, a bagging platform hingedly connected adjacent the lower edge of said wall and normally supported therefrom in a horizontal position extending stubblewardly of the wall, said platform being folded inwardly and upwardly alongside the wall for travel clearance, and means to detachably secure the platform in such position.

3. In combination, a harvester thresher having a body including frame structure extending from its stubbleward side, a vertical wall carried by said frame structure, a bagging platform pivotally connected adjacent said wall, a brace to hold the platform in position for bagging, said brace being removable to enable the platform to be folded upwardly alongside said wall to narrow the harvester thresher for transport, and means to hold the platform in its folded position.

4. The combination with a harvester thresher having a separator body carried on an axle and main wheel, a vertical longitudinally extending wall located stubblewardly of said wheel, upper and lower supports extending from the body to carry said wall, a horizontally disposed bagging platform connected to and extending stubblewardly of the wall, a seat mounted along the stubbleward edge of said platform, and braces extending from the platform and seat to said wall.

5. The combination with a harvester thresher having a separator body carried on an axle and main wheel, a vertical longitudinally extending wall located stubblewardly of said wheel, upper and lower supports extending from the body to carry said wall, a horizontally disposed bagging platform connected to and extending stubblewardly of the wall, a seat mounted along the stubbleward edge of said platform, said platform being hingedly connected to the lower edge of the wall, braces extending from the platform and seat to said wall, said braces being temporarily removable from the wall whereupon the platform and seat may be folded upwardly and inwardly alongside the wall, and means to support the said parts in folded position.

6. In combination, a harvester thresher having a body including frame structure extending laterally from its stubbleward side, a longitudinally extending vertical wall carried by said frame structure, a main wheel carrying an axle which supports the body, said wall also carried by the axle adjacent said wheel, a bagging platform, and means for pivotally carrying said platform adjacent the wall to enable upward folding movement thereof to narrow the harvester thresher for transport clearance.

7. In combination, a harvester thresher having a body including frame structure extending laterally from its stubbleward side, a longitudinally extending vertical wall carried by said frame structure, a main wheel carrying an axle which supports the body, said wall also carried by the axle adjacent said wheel, a unitary bagging platform and bag chute pivotally mounted adjacent the lower edge of said wall to enable folding movement of the unit to narrow the harvester thresher for transport clearance, and means to hold the bagging unit releasably in its folded position.

8. In combination, a harvester thresher having a body, a bag platform foldingly supported at the stubbleward side of the body, a seat included in the platform, and means to enable folding of the seat laterally endwise of the platform.

9. In combination, a harvester thresher having a body, a bag platform carried adjacent the body and extending laterally thereof, an elevated seat carried on the platform at its stubbleward edge, means whereby the seat may be folded to a position stubblewardly of the platform, means to secure the seat in such position, and means whereby the platform and seat may be swung upwardly adjacent the stubbleward side of the body to narrow the harvester thresher for transport clearance.

10. In combination, a harvester thresher having a body, a unitary bagging platform and bag chute carried adjacent the stubbleward side of the body and in normal position extending laterally thereof, an elevated seat carried on the platform, means to enable the seat to be folded to a position laterally of the stubbleward edge of said platform, means to enable the platform and bag unit with the folded seat to be swung upwardly to a substantially vertical position alongside the stubbleward side of the body to narrow the harvester thresher for transport clearance, and means to hold the bagging unit in such transport position.

11. In combination, a harvester thresher having a body including frame structure extending laterally from its stubbleward side, a longitudinally extending vertical wall carried by said frame structure, a main wheel carrying an axle which supports the body, said wall also carried by the axle adjacent said wheel, a unitary bagging platform and bag chute pivotally carried adjacent said wall and in normal position extending horizontally and laterally thereof, a brace to hold the platform in such position, an elevated seat structure carried on the platform at its stubbleward edge, means to enable the seat structure to be folded to a position horizontally and laterally of the stubbleward edge of the platform, said platform brace being removable to enable the bagging unit with the seat to be folded upwardly to a substantially vertical position alongside the vertical wall to narrow the harvester thresher for transport clearance, and means to releasably retain the bagging unit in such transport position.

ALBERT B. WELTY.